(12) United States Patent
Chen et al.

(10) Patent No.: US 8,190,383 B2
(45) Date of Patent: May 29, 2012

(54) METHODS OF INVERSE DETERMINATION OF MATERIAL PROPERTIES OF AN ELECTROCHEMICAL SYSTEM

(75) Inventors: Yen-Hung Chen, Ann Arbor, MI (US); Xiangchun Zhang, Ann Arbor, MI (US); Chia-Wei Wang, Ypsilanti, MI (US); Ann Marie Sastry, Ypsilanti, MI (US)

(73) Assignee: Sakti3, Inc., Ann Arbor, MI (US)

( * ) Notice: Subject to any disclaimer, the term of this patent is extended or adjusted under 35 U.S.C. 154(b) by 0 days.

(21) Appl. No.: 13/252,144

(22) Filed: Oct. 3, 2011

(65) Prior Publication Data

US 2012/0089353 A1    Apr. 12, 2012

(51) Int. Cl.
*G01R 31/36* (2006.01)
(52) U.S. Cl. .......................................... 702/63
(58) Field of Classification Search ...................... 702/63
See application file for complete search history.

(56) References Cited

U.S. PATENT DOCUMENTS

| | | | |
|---|---|---|---|
| 7,945,344 B2* | 5/2011 | Wang et al. | 700/103 |
| 2003/0064292 A1* | 4/2003 | Neudecker et al. | 429/235 |
| 2011/0301931 A1* | 12/2011 | Gering | 703/13 |

\* cited by examiner

*Primary Examiner* — Aditya Bhat
(74) *Attorney, Agent, or Firm* — Richard T. Ogawa; Ogawa P.C.

(57) ABSTRACT

A method of determining at least one material property of at least one component of an electrochemical system (fully or partially completed) using a process to reduce a difference of a performance characteristic between a numerical simulation result of a physical model and an empirical result. The method includes providing an electrochemical cell using a thin film process and performing a plurality of tests on the electrochemical cell to identify one or more target performance characteristics of the electrochemical cell. The method includes performing a surrogate based analysis process and determining a plurality of outputs of the surrogate based analysis function and determines a value of the unknown material property.

20 Claims, 15 Drawing Sheets

301

$f(x) = p1*x^5 + p2*x^4 + p3*x^3 + p4*x^2 + p5*x + p6$

Coefficients (with 95% confidence bounds):

METHODS OF INVERSE DETERMINATION OF MATERIAL PROPERTIES OF AN ELECTROCHEMICAL SYSTEM

CROSS-REFERENCES TO RELATED APPLICATIONS

The present application incorporates by reference, for all purposes, the following pending patent application: U.S. patent application Ser. No. 12/484,959, filed Jun. 15, 2009.

BACKGROUND OF THE INVENTION

This present invention relates to the manufacture of electrochemical cells. More particularly, the present invention provides a method to determine unknown material properties of an electrochemical system based on an inverse solution process. Merely by way of example, the invention has been provided with the use of lithium based cells, but it would be recognized that other materials such as zinc, silver, copper and nickel could be designed in the same or like fashion. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

Conventional quality control of electrochemical cells general measures the cell performance. Performance targets for electrochemical cells include adequate specific energy/power and energy/power density, cell and module robustness, safety, aging characteristics, lifetime, thermal behavior, and material/shelf life. However, achieving the performance targets is accomplished through trial and error, which is tedious and time consuming. The type and quantity of material for the electrochemistry cell is selected for each component. The resulting battery is tested to determine whether the performance targets have been met, which is generally not the case even after repeated trial and error. The unknown material properties of an electrochemical system often must be determined before selecting the right type and quantity of material and designing the electrochemistry cell. In addition, to determine the unknown material properties also helps cell manufacturer to identify the bottleneck component of the cell performance and improve the specific component.

Several published literature reports attempt to provide systematic and numerical approaches to analyzing and designing batteries. A pioneering approached was described in U.S. Pat. No. 7,945,344, titled "Computational Method for Design and Manufacture of Electrochemical Systems," in the names of Chia-Wei Wang, Fabio Albano, and Ann Marie Sastry, and assigned to the same Sakti3, Inc. of Ann Arbor Mich., and hereby incorporated by reference in its entirety. Computer simulation can generate relationship between input material properties against one or more performance characteristics in an electrochemical cell. By systematically varying the unknowing material properties and generating the performance characteristics, one can determine the unknown material properties by reducing the difference in the numerical simulation result and the empirical result of the performance characteristics. Although highly successful, certain limitations still exist. As an example, more sophisticated analysis techniques and information are often desirable.

From the above, it is seen that improved techniques for designing and manufacturing electrochemical cells are highly desired.

BRIEF SUMMARY OF THE INVENTION

According to the present invention, techniques related to the manufacture of electrochemical cells are provided. More particularly, the present invention provides a method to determine unknown material properties of an electrochemical system based on inverse solution process. Merely by way of example, the invention has been provided with use of lithium based cells, but it would be recognized that other materials such as zinc, silver, copper and nickel could be designed in the same or like fashion. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

In a specific embodiment, the present invention provides a method of determining at least one material property of at least one component of an electrochemical system (fully or partially completed) using a process to reduce a difference of a performance characteristic between a numerical simulation result of a physical model and an empirical result. The method includes providing an electrochemical cell using a thin film process and performing a plurality of tests on the electrochemical cell to identify one or more target performance characteristics of the electrochemical cell. Preferably, the plurality of tests includes respective operational modes of the electrochemical cell. The method also includes deriving a plurality of performance characteristics from the plurality of tests to provide a performance database, which comprising the operational modes and the respective performance characteristics. The method also includes performing a surrogate based analysis process and determining a plurality of outputs of the surrogate based analysis function. As an example, the determining of the output uses at least one or more of a linear equation algorithm, Levenberg-Marquardt Algorithm, Gauss-Newton Algorithm, Trust-Region Dogleg Method, Trust-Region-Reflective Methods, medium-scale algorithms, or large-scale algorithms. The method also determines a value of the unknown material property. In a preferred embodiment, the value is determined using a solution of the surrogate based analysis process.

In an alternative specific embodiment, the present invention provides a computer aided system for determining at least one material property of at least one component of an electrochemical system (fully or partially completed) using a process to reduce a difference of a performance characteristic between a numerical simulation result of a physical model and an empirical result. The system includes a processor coupled to a computer readable memory or memories including computer codes. The computer codes are directed to plurality of tests for an electrochemical cell to identify one or more target performance characteristics of the electrochemical cell. Preferably, the plurality of tests includes respective operational modes of the electrochemical cell. The computer codes also are directed to deriving a plurality of performance characteristics from the plurality of tests to provide a performance database, which comprising the operational modes and the respective performance characteristics. The codes are also directed to performing a surrogate based analysis process and determining a plurality of outputs of the surrogate based analysis function. One or more codes are also directed to determining a value of the unknown material property. Depending upon the embodiment, the system may also include other computer codes to carry out the functionality described herein, as well as outside of the present specification.

In a preferred embodiment, the unknown material property of the electrochemical cell is at least one of:

a transport property including at least one of electrical conductivity, ionic conductivity, ionic diffusivity, or thermal conductivity;

a kinetic property including at least a chemical reaction rate;

an interfacial property including a contact resistance;

a mechanical property including at least one of a Young's Modulus, a Poisson's ratio, a bulk modulus, a yield strength, an ultimate stress, a fracture stress, a thermal expansion coefficient, an intercalation expansion coefficient;

a geometric property including at least one of a porosity, a thickness, a curvature; and a spatial variation of a mass density. Of course, there can be other variations, modifications, and alternatives.

In a preferred embodiment, the performance characteristics comprise more than one of a time variation of charge or discharge voltage curve, state of charge (SOC) variation of charge or discharge voltage curve, concentration profile, concentration gradient profile, temperature variation, temperature gradient profile, stress-strain variation, film curvature variation, and stress-strain gradient profile.

Also in a preferred embodiment, the operational mode of an electrochemical system comprises at least one of a profiles of constant current charge or discharge, variant current charge or discharge, constant power charge or discharge, variant constant power charge or discharge, constant voltage charge or discharge, variant voltage charge or discharge, and combinations of any of them in a constant temperature or any given temperature profile.

Benefits are achieved over conventional techniques. In one or more embodiments, the present method and system takes an unconventional approach to design an electrochemistry or use of other materials for a selected battery architecture, which is conventionally an ending point and not a starting point for a design process. In a preferred embodiment, the present method and system uses an inverse process, which takes advantage of a performance characteristic to derive a feature of an electrochemical cell. That is, the performance characteristic, such as cell charge/discharge curve is used to determine cell dimensions, materials, and other configuration parameters, and the like, and most preferably intrinsic cell properties such as diffusivity, conductivity, resistivity, kinetic constants, thermal expansion coefficient(s), and others. Accordingly, we have been able to systematically produce a cost effective design and manufacturing process to meet performance targets such as performance, reliability, safety, lifecycle, reclamation and reuse, cost, and other factors. According to the present invention, conventional computer software and hardware can be used for computer-aided design of selecting one or more electro-chemistries (anode/cathode and electrolyte) for a selected design architecture. In a preferred embodiment, the present method and system can simulate design and processing such as packing in three dimensions, using computer aided hardware and analysis techniques such as mesh generation with irregular geometric objects with memory sizes of 32 gigabyte and greater, and processing speeds of 3 gigahertz and greater. Depending upon the specific embodiment, one or more of these benefits may be achieved.

The present invention achieves these benefits and others in the context of known process technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 5 is a surrogate function according to an embodiment of the present invention;

DETAILED DESCRIPTION OF THE INVENTION

Figure 1:
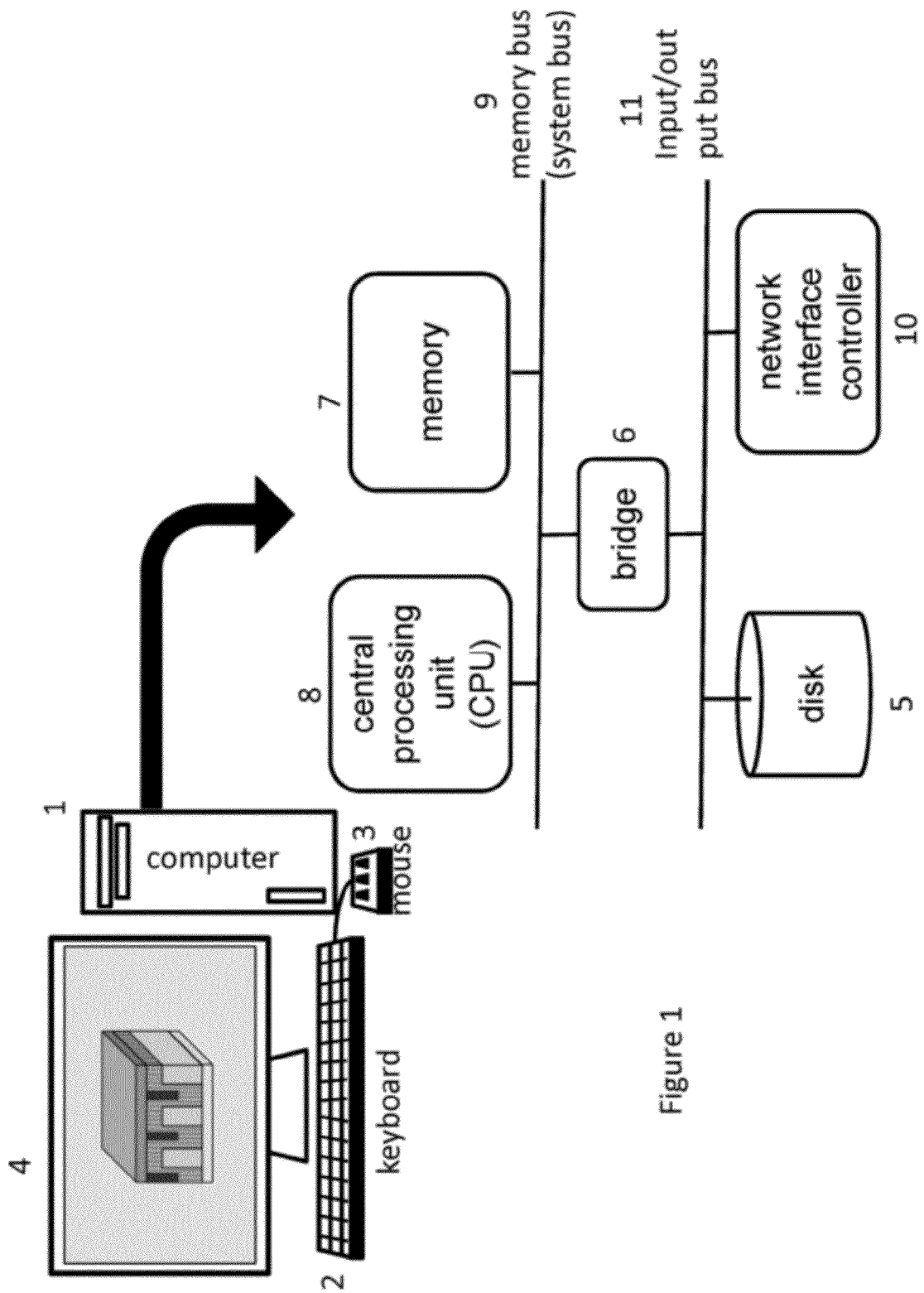
FIG. 1 is a simplified diagram of computer aided analysis system for an electro-chemical cell according to an embodiment of the present invention.

According to the present invention, techniques to determine the unknown material properties of an electrochemical system based on inverse solution process are provided. More particularly, the present invention provides a method to determine at least one unknown material property of an electrochemical system. The electrochemical system is made using thin film process and it includes components of an anode, cathode, separator, electrolyte, current collectors, substrate, and an overlying barrier material. Additionally, such electrochemical system can be fully or partially completed, which includes at least two components and at most ten components of an anode, cathode, separator, electrolyte, current collectors, substrate, and an overlying barrier material. Merely by way of example, the invention has been provided with use of lithium based cells, but it would be recognized that other materials such as zinc, silver, copper and nickel could be designed in the same or like fashion. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

A plurality of tests on the electrochemical cell to identify one or more target performance characteristics of the electrochemical cell are performed in different operational modes of the electrochemical cell. And then the target performance characteristics are saved in the performance database. Meanwhile, a computer system for computer-aided model and a surrogate based analysis process are used and performed to generate a difference function between the numerical simulation result and the empirical result for the electrochemical cell. The process starts from selecting an upper bound and a lower bound for an unknown material property of a material of a component of the electrochemical cell. Within the range, a design of experiment (DOE) process is used to efficiently determine the sampling points. A computer aided engineering process is used to simulate the electrochemical cell with inputs of a plurality of fixed parameters (e.g., intrinsic material properties, interface conditions, operational conditions). By comparing the numerical simulation result and the empirical result of the performance characteristics, a surrogate based analysis function can be generated for the result difference with inputs of various of the unknown properties. After obtaining the surrogate based analysis function, the unknown material property can be determined by searching the solution of the surrogate based analysis function to reduce the difference of the numerical simulation result and the empirical result. Further details of the present method and system can be found throughout the present specification and more particularly below.

It is also understood that the examples and embodiments described herein are for illustrative purposes only and that various modifications or changes in light thereof will be suggested to persons skilled in the art and are to be included within the spirit and purview of this application and scope of the appended claims.

Figure 1A:
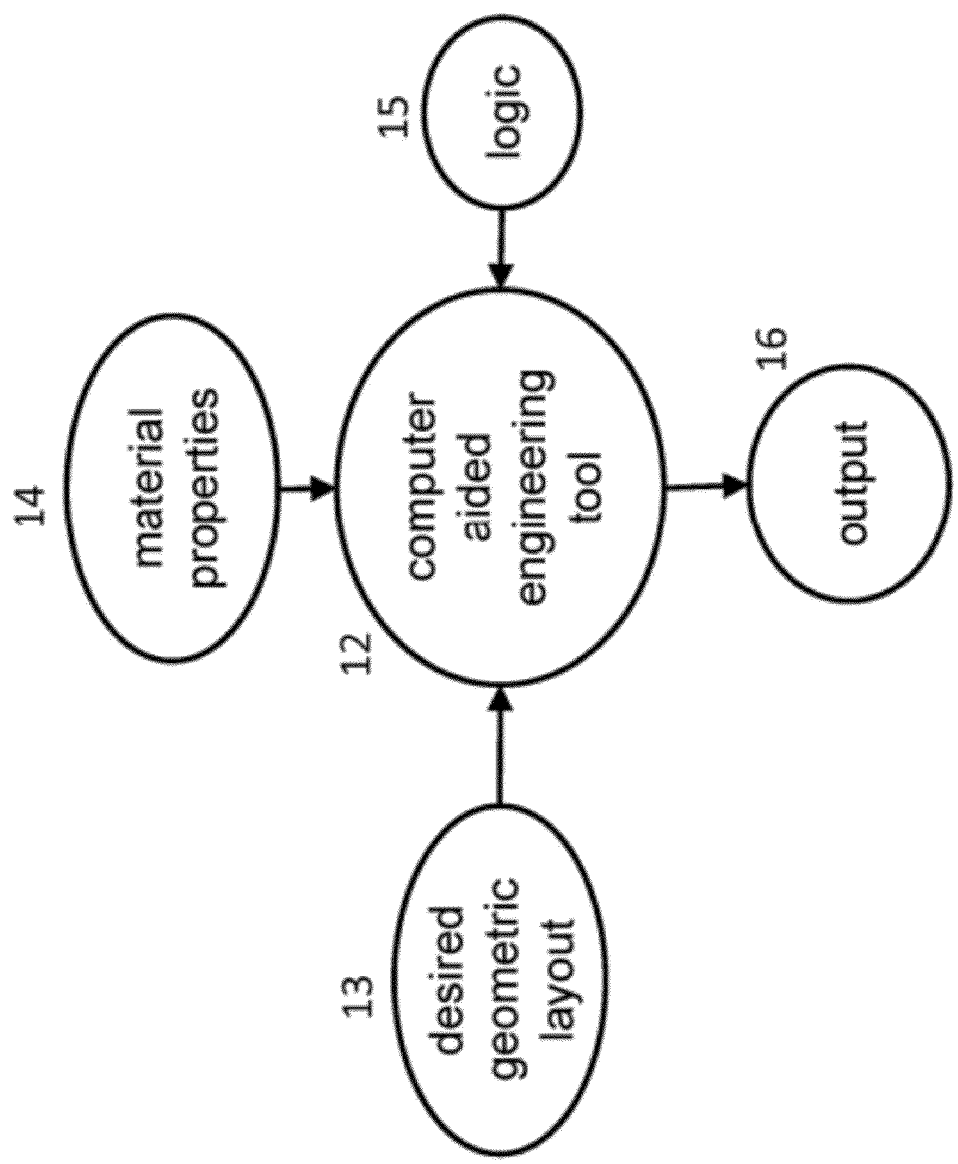
FIG. 1A is a simplified block diagram of a computer aided analysis process according to an embodiment of the present invention.

FIG. 1A illustrates a computer system for computer-aided design for electrochemical cell, wherein a computer 1, responds to inputs from keyboard 2, and/or other digitizing input device such as a light pen, or a mouse 3, and displays designs of the three-dimensional electrochemical cell on the graphical display device 4. This diagram is merely an illustration and should not unduly limit the scope of the claims herein. One of ordinary skill in the art would recognize many variations, modifications, and alternatives.

Depending upon the embodiment, the present system and resulting method can be carried out using various computer codes on a computer-aided system. In a specific embodiment, the computer aided system is configured for determining at least one material property of at least one component of an electrochemical system (fully or partially completed) using a process to reduce a difference of a performance characteristic between a numerical simulation result of a physical model and an empirical result. The system includes a processor coupled to a computer readable memory or memories including computer codes. The computer codes are directed to plurality of tests for an electrochemical cell to identify one or more target performance characteristics of the electrochemical cell. Preferably, the plurality of tests includes respective operational modes of the electrochemical cell. The computer codes also are directed to deriving a plurality of performance characteristics from the plurality of tests to provide a performance database, which comprising the operational modes and the respective performance characteristics. The codes are also directed to performing a surrogate based analysis process and determining a plurality of outputs of the surrogate based analysis function. One or more codes are also directed to determining a value of the unknown material property. Depending upon the embodiment, the system may also include other computer codes to carry out the functionality described herein, as well as outside of the present specification.

FIG. 1A depicts the tool 12, of the present invention regarding computer-aided process of a three-dimensional electrochemical cell, wherein all of the programs for generating the geometric layout, the logic, and solving required equations are integrated. This diagram is merely an illustration and should not unduly limit the scope of the claims herein. One of ordinary skill in the art would recognize many variations, modifications, and alternatives. The desired geometric layout 13, is generated from the database and is processed by the computer graphics program. The material properties 14 are input of material properties. The logic 15, underlies the behavior of the materials. Then, the operation of the three-dimensional electrochemical cell is simulated based on the information gathered by this computer aided design tool, and is output to the database structure 16.

Figure 1B:
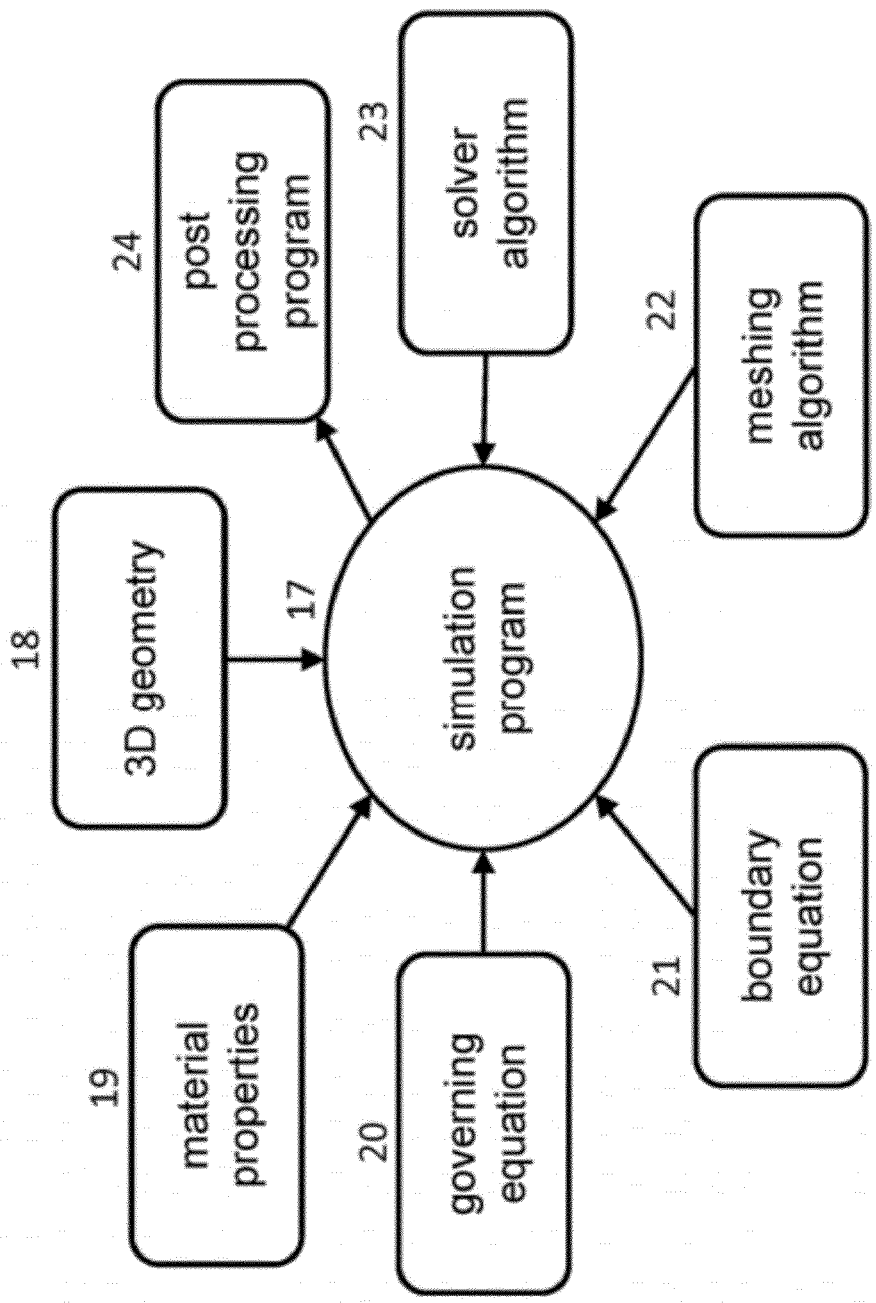
FIG. 1B is a simplified illustration of a simulation program used as an engine of the present invention.

FIG. 1B illustrates the simulation program used as an engine of the present invention. This diagram is merely an illustration and should not unduly limit the scope of the claims herein. One of ordinary skill in the art would recognize many variations, modifications, and alternatives. The program integrates the input data, the logic, meshing algorithm, solving algorithm, and the post-process algorithm together. This simulation program could be obtained commercially or built in-house. The input data includes the geometric information 18 and the material properties 19. The governing equations 20 and boundary equations 21 are chosen based on the underlying logic for the material behaviors. The meshing algorithm 22 chooses the order of the governing and boundary equations and provides the degree of the approximation to the real material behaviors. The solver algorithm 23 provides the efficiency and accuracy of the end results. The post-process algorithm 24 provides showing the computational results, and showing results in terms graphics', charts', or tables' forms.

Figure 1C:
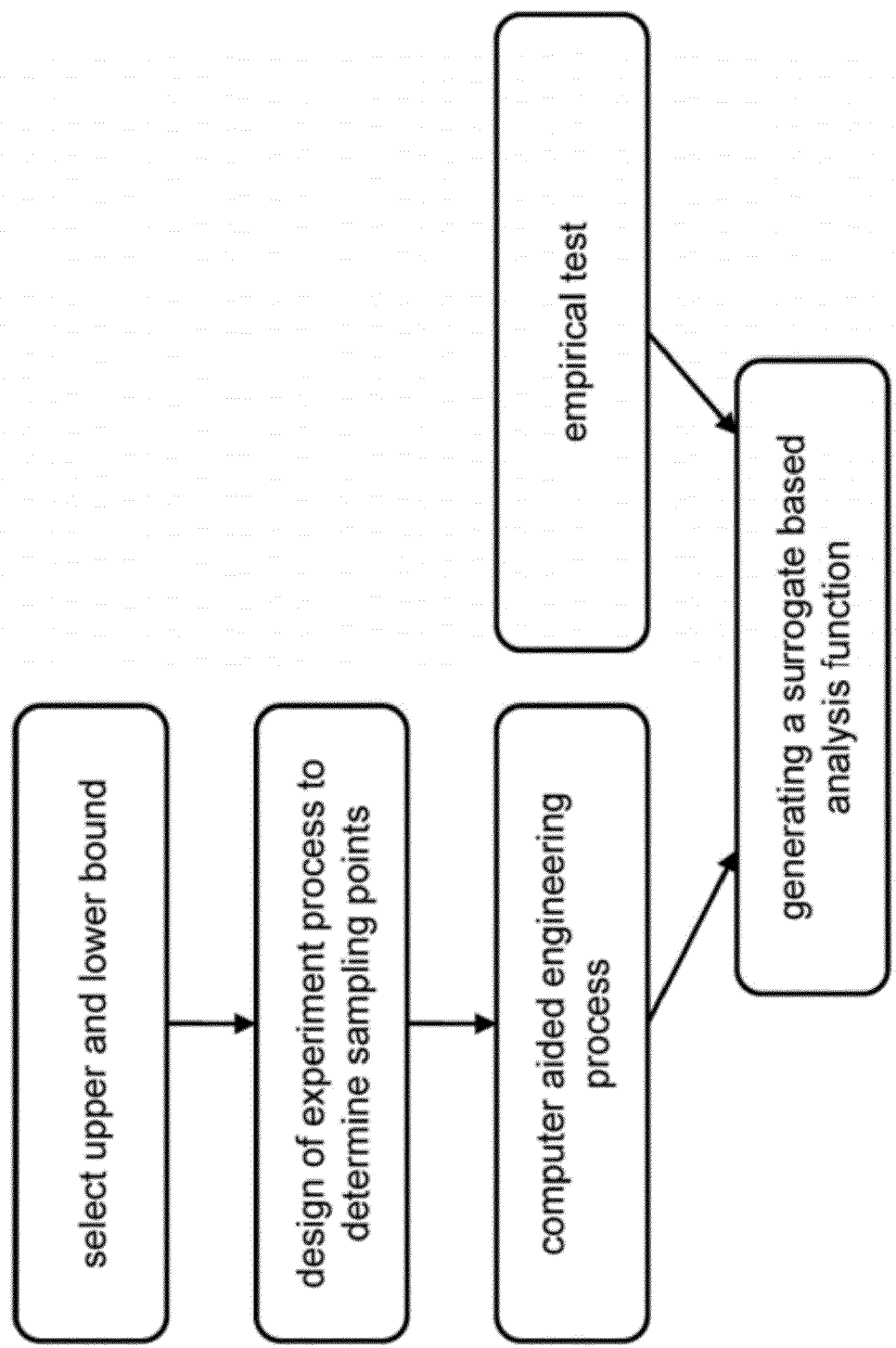
FIG. 1C is a simplified illustration of a surrogate based analysis process of the present invention.

FIG. 1C illustrates the surrogate based analysis process of the present invention. This diagram is merely an illustration and should not unduly limit the scope of the claims herein.

The surrogate based analysis process comprises providing an upper bound and a lower bound for an unknown material property of a material of a component of the electrochemical cell, determining a plurality of sampling points between the upper bound and the lower bound of the unknown material property using a design of experiment (DOE) process. The surrogate based analysis process also comprises determining a plurality of performance characteristics for the respective sampling points using a computer aided engineering process and a plurality of fixed parameters (e.g., intrinsic material properties, interface conditions, operational conditions). The surrogate based analysis function is generated for a difference between the numerical simulation result and the empirical result for the electrochemical cell.

In a specific embodiment, the surrogate based analysis process comprises a computer aided engineering process. Preferably, the computer aided engineering process is selected from at least one of a finite element method (FEM), a finite difference method (FDM), a boundary element analysis, element-free Galerkin (EFG) or Smoothed Particle Hydrodynamics (SPH) method. The computer aided engineering process is for analysis of the electrochemical system and is a multi-physics model, the multi-physics model includes one or more functions to simulate one or more relationships, the relationships include mechanical properties and responses obtained via equilibrium or dynamic load considerations, thermal properties and temperature distributions obtained via heat transfer methods, or cell transport properties potential and concentrations distribution of species obtained via kinetic relations and/or fluid flow modeling.

In an alternative embodiment, the surrogate based analysis process comprises providing an upper bound and a lower bound for an unknown material property of a material of a component of the electrochemical cell, determining a plurality of sampling points between the upper bound and the lower bound of the unknown material property using a design of experiment (DOE) process, determining a plurality of performance characteristics for the respective sampling points using a computer aided engineering process and a plurality of fixed parameters, which include at least one of intrinsic material properties, interface conditions, or operational conditions. The process also generates a surrogate based analysis function for a difference between the numerical simulation result and the empirical result for the electrochemical cell. In a specific embodiment, the surrogate based analysis functions of target performance characteristics against sampling points include exponential, Fourier, Gaussian, interpolant, Kriging, polynomial, power, sinusoidal, Weibull, weight averaged, or any combination of these.

Figure 1D:
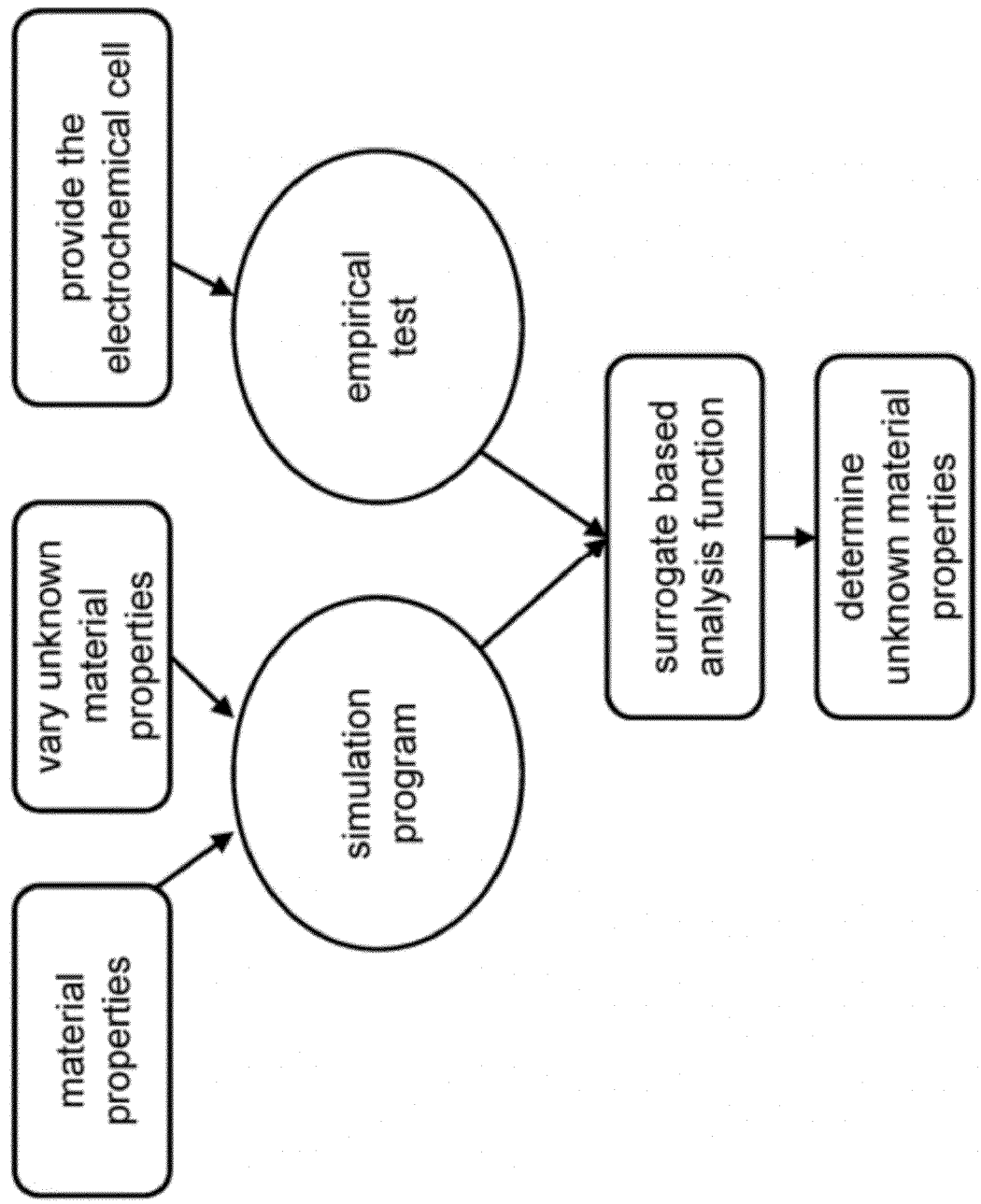
FIG. 1D is a simplified illustration of an inverse process of the present invention.

FIG. 1D illustrates the inverse process of the present invention. This diagram is merely an illustration and should not unduly limit the scope of the claims herein. The inverse process comprises providing an electrochemical cell using a thin film process. A plurality of tests are performed on the electrochemical cell to identify one or more target performance characteristics of the electrochemical cell, the plurality of tests including respective operational modes of the electrochemical cell. A plurality of performance characteristics are derived from the plurality of tests to provide a performance database, the performance database comprising the operational modes and the respective performance characteristics. The inverse process also comprises a computer aided engineering process integrating with a surrogate based analysis process as shown in FIG. 1C. A surrogate based analysis function is generated for the result difference with inputs of various of the unknown properties. After obtaining the surrogate based analysis function, the unknown material property can be determined by searching the solution of the surrogate based analysis function to reduce the difference of the numerical simulation result and the empirical result.

Figure 2:
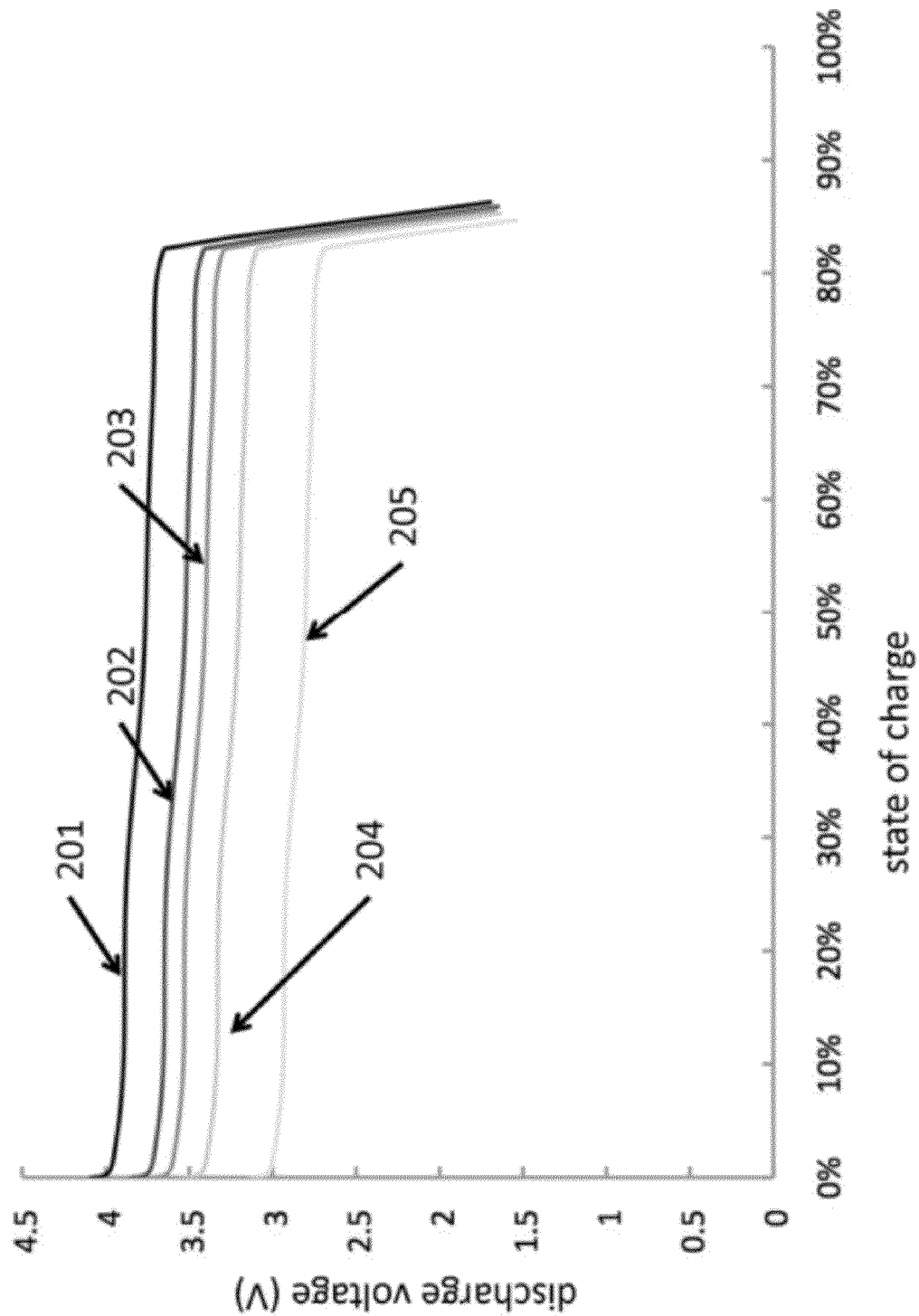
FIG. 2 is a discharge plot comparing voltage and a state of change for electrochemical cells according to an embodiment of the present invention.

FIG. 2 illustrates an electrochemical cell test result in various discharge rate conditions, wherein 0.1C 201, 0.3C 202, 0.5C 203, 0.8C 204, and 1C 205. The voltage versus SOC curve is one of the target performance characteristics and those curves are saved in the performance database as shown 5 in FIG. 1.

Figure 3:
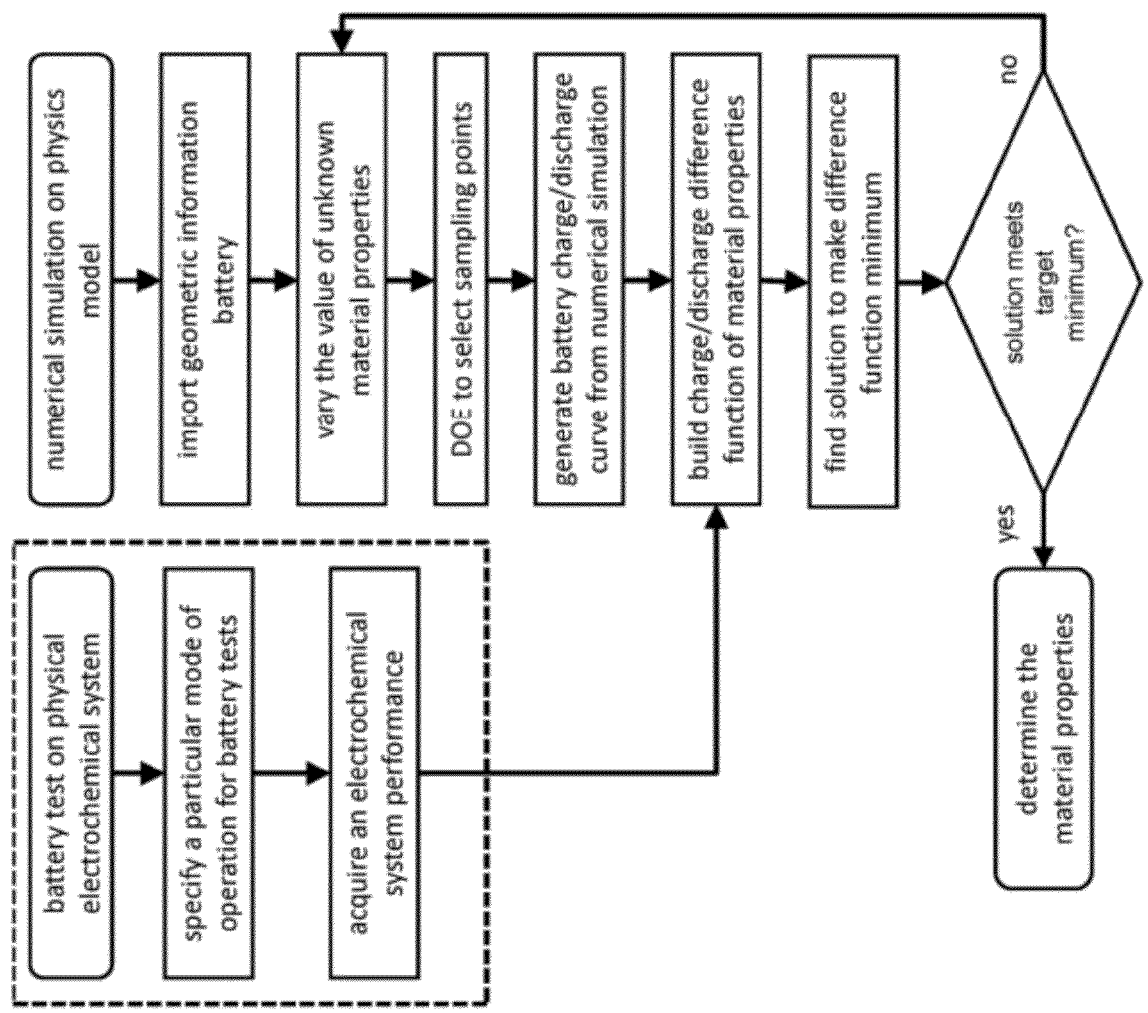
FIG. 3 is a simplified flow diagram of an analysis process for an electrochemical cell according to an embodiment of the present invention.

FIG. 3 illustrates the flow diagram of the method to determine the unknown properties. The empirical result of the target performance characteristics is obtained from tests on physical electrochemical system as shown in the dashed line in FIG. 3. The numerical simulation result is obtained by performing computer-aided model with fixed parameters (e.g., intrinsic material properties, interface conditions, operational conditions) and varied unknown material properties. Unknown material properties need to be selected the proper upper bound and higher bound, and design of experiment (DOE) is performed to selecte the sampling points. By comparing the numerical simulation result and the empirical result of the performance characteristics, a surrogate based analysis function can be generated for the result difference with inputs of various of the unknown properties. After obtaining the surrogate based analysis function, the unknown material property can be determined by searching the solution of the surrogate based analysis function to reduce the difference of the numerical simulation result and the empirical result. If the solution doesn't meet the minimum requirement, the proper upper bound and higher bound of unknown material properties need to be re-selected and the rest process needs to be performed until solution meets target minimum and unknown material properties are determined. Further details of the present method and system can be found throughout the present specification and more particularly based upon the examples below.

Example 1

Figure 4:
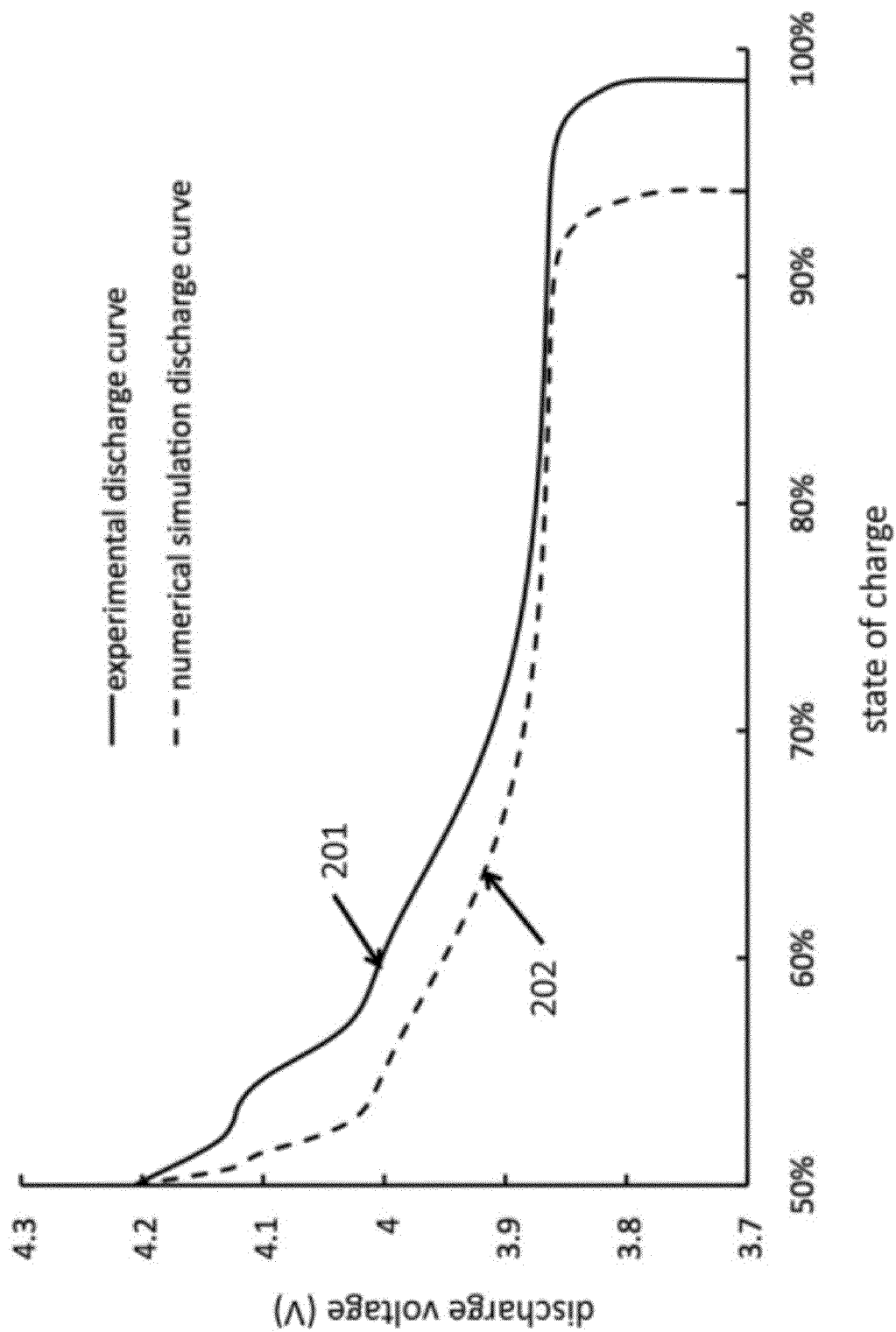
FIG. 4 is an alternative discharge plot comparing voltage and a state of change for electrochemical cells according to an embodiment of the present invention.
Figure 5:
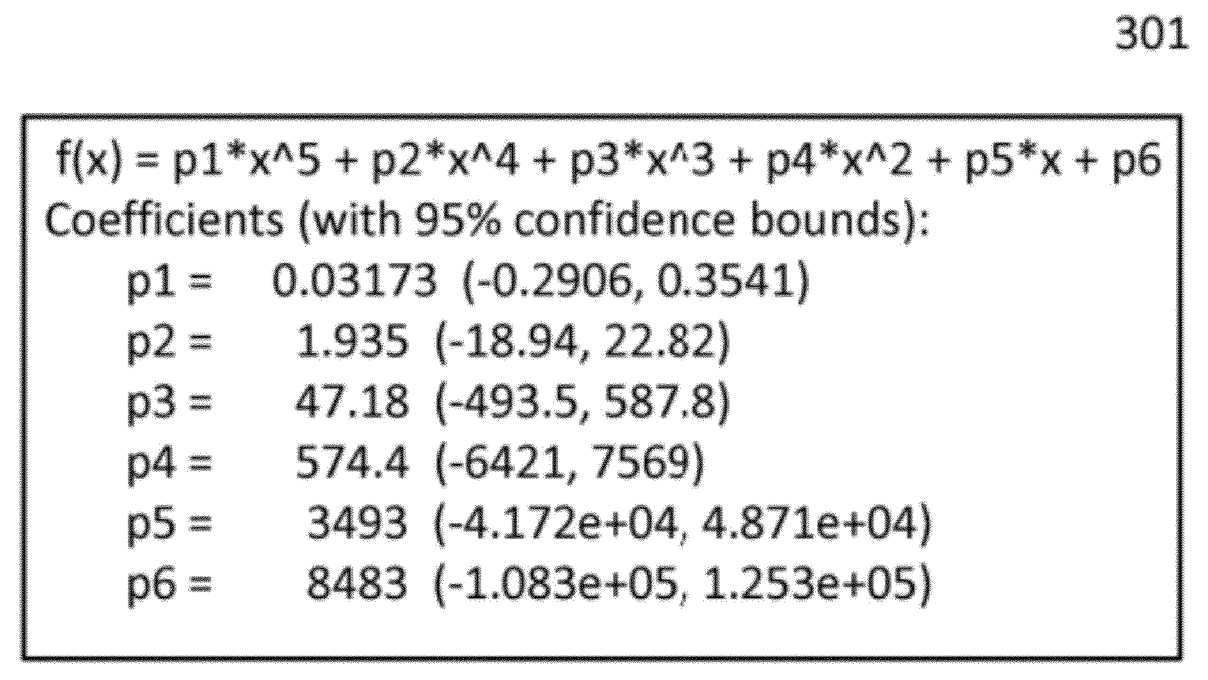

Determination of Ionic Diffusivity of Cathode Material of an Electrochemical Cell This example demonstrates the process of determination of ionic diffusivity of cathode material of an electrochemical cell. As an example of the problems encountered by the battery designer, the value of ionic diffusivity of cathode material for the present electrochemical cell setup is unknown. The materials for the electrochemical cell are copper as anode current collector, lithium metal as anode, lithium cobalt oxide as cathode, polymer with lithium salts as the electrolyte, and aluminum as cathode current collector. A separator is unnecessary because a polymer electrolyte is used. These materials used here are for illustrative purposes, but are not limited by these materials. A flow diagram is shown in FIG. 3. As in this example, the electrochemical cell is tested under 5C constant current discharge rate and discharge is shown as 201 in FIG. 4. On the other hand, numerical simulations of the electrochemical cell model are conducted with different values of ionic diffusivities resulting various discharge curves. One example is shows as 202 in FIG. 4. The area difference enclosed by experimental and simulation curves then can be calculated. The function of area difference can be built with input of ionic diffusivity in logarithm scale 301 in FIG. 5. By finding the minimum solution of the area difference function, ionic diffusivity of cathode can be identified.

Example 2

Figure 6:
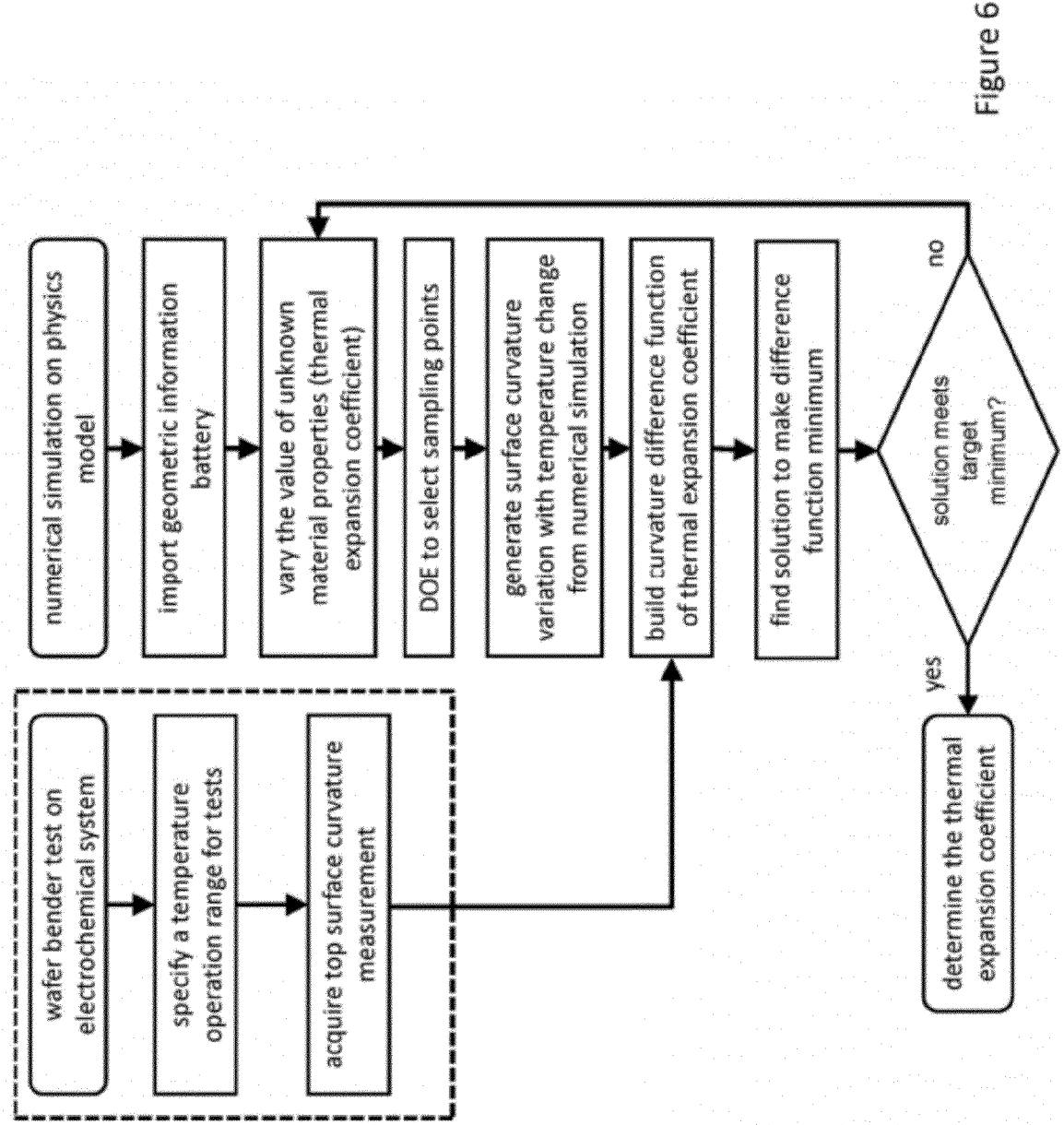
FIG. 6 is a simplified flow diagram of an analysis process for a wafer bender configured with an electrochemical cell according to an embodiment of the present invention.
Figure 7:
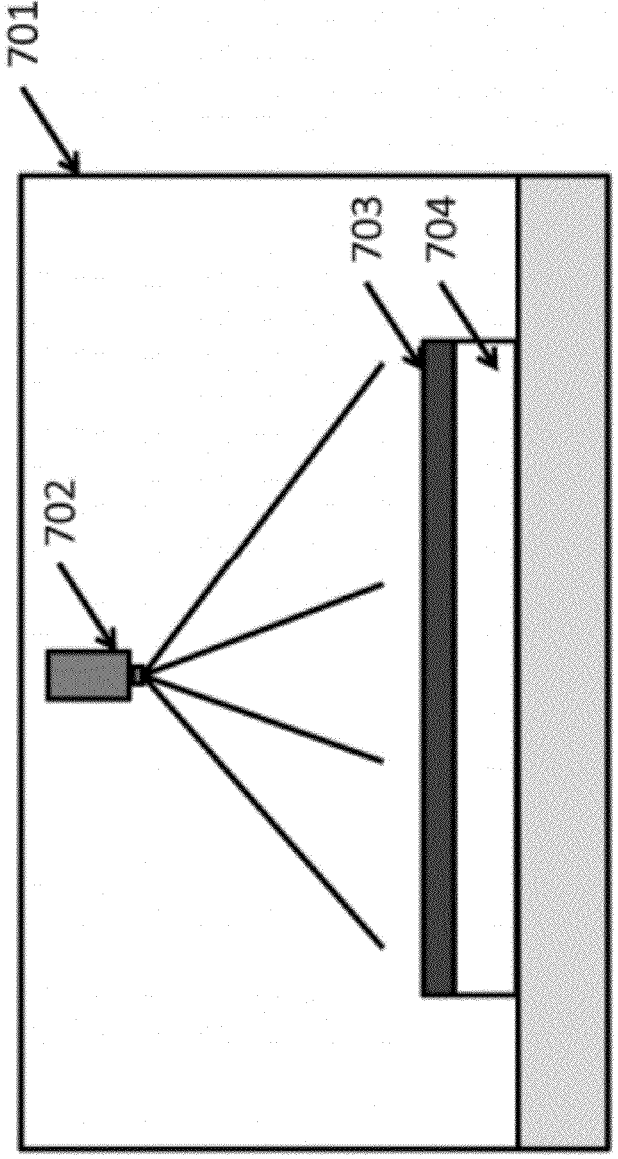
FIG. 7 is a schematic illustration of a wafer bender of FIG. 6 according to an embodiment of the present invention.

Determination of Thermal Expansion Coefficient of Cathode Material of an Electrochemical Cell This example demonstrates the process of determination of thermal expansion coefficient of cathode material of an electrochemical cell. As an example of the problems encountered by the battery designer, the value of thermal expansion coefficient of cathode material for the present electrochemical cell setup is unknown. The materials for the partially completed electrochemical cell are lithium cobalt oxide as cathode as 703 in FIG. 7, and silicon wafer as substrate as 704 in FIG. 7. These materials used here are for illustrative purposes, but are not limited by these materials. A flow diagram is shown in FIG. 6. As in this example, the partially completed electrochemical cell is tested from 25° C. to 100° C. inside wafer bender thermal chamber as 701 in FIG. 7. Laser scan is used to measure top surface curvature of cathode layer as 702 in FIG. 7. On the other hand, numerical simulations for the same electrochemical system are conducted with different values of thermal expansion coefficient resulting various top surface curvature. The difference of experimental and simulation results then can be modeled as a function. By finding the solution to make the difference function minimum, thermal expansion coefficient of cathode can be identified.

Example 3

Figure 8:
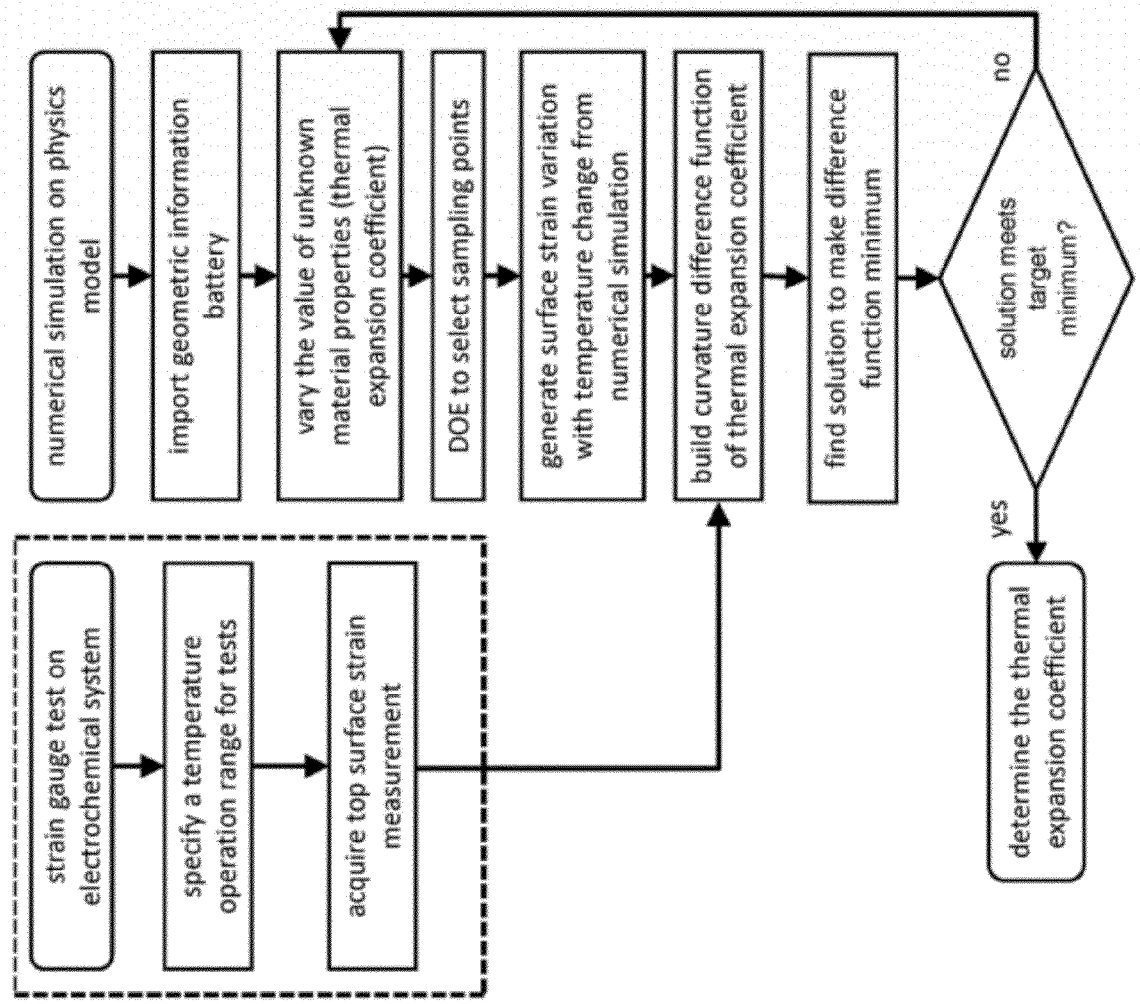
FIG. 8 is a discharge plot comparing voltage and a state of change for electrochemical cells according to an embodiment of the present invention.
Figure 9:
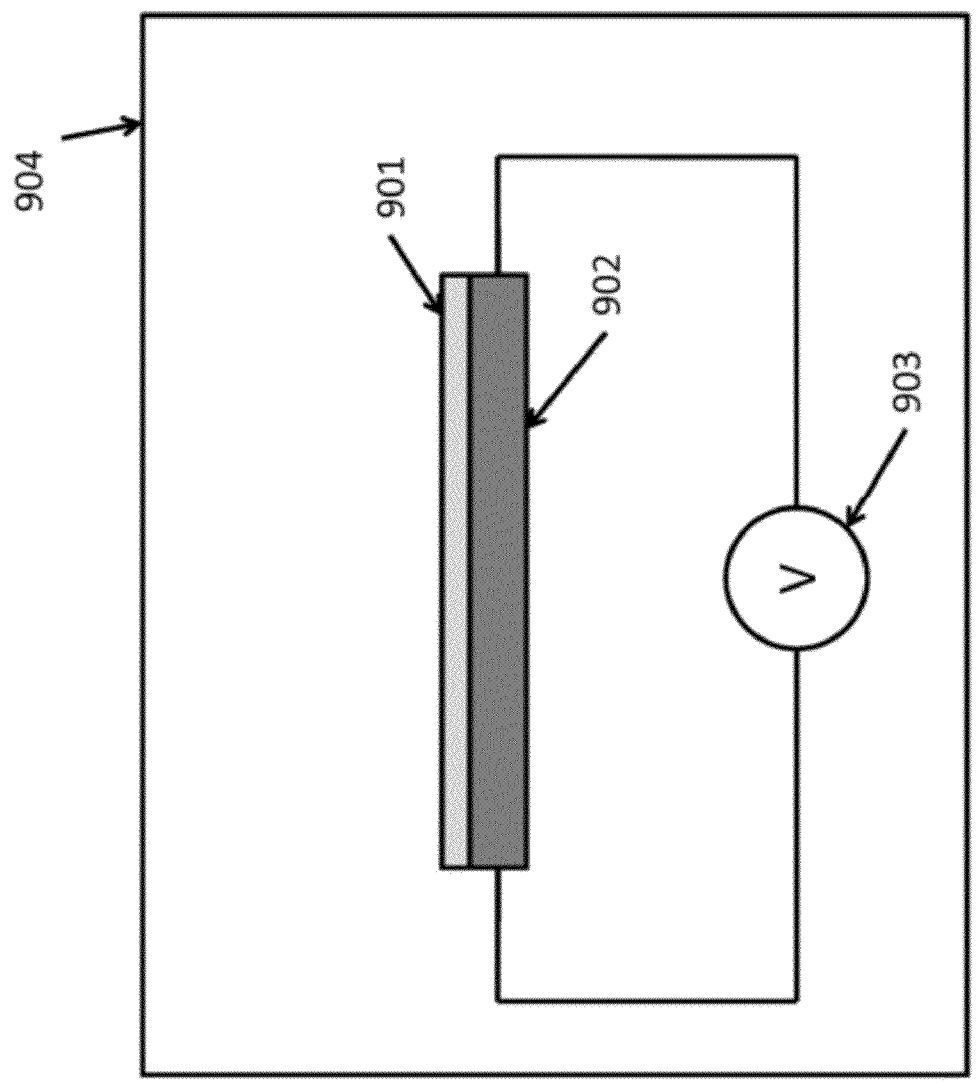
FIG. 9 is a simplified flow diagram of an analysis process for a strain gauge configured with an electrochemical cell according to an embodiment of the present invention.

Determination of Thermal Expansion Coefficient of Cathode Material of an Electrochemical Cell This example demonstrates the process of determination of thermal expansion coefficient of cathode material of an electrochemical cell. As an example of the problems encountered by the battery designer, the value of thermal expansion coefficient of cathode material for the present electrochemical cell setup is unknown. The materials for the partially completed electrochemical cell are lithium cobalt oxide as cathode as 901 in FIG. 9, and a strain gauge as substrate as 902 in FIG. 9. A meter is used to read strain value from strain gauge as 903 in FIG. 9. These materials used here are for illustrative purposes, but are not limited by these materials. A flow diagram is shown in FIG. 8. As in this example, the partially completed electrochemical cell is tested from 25° C. to 150° C. inside wafer bender thermal chamber as 904 in FIG. 9. On the other hand, numerical simulations for the same electrochemical system are conducted with different values of thermal expansion coefficient resulting various top surface strain. The difference of experimental and simulation results then can be modeled as a function.

By finding the solution to make the difference function minimum, thermal expansion coefficient of cathode can be identified.

Example 4

Figure 10:
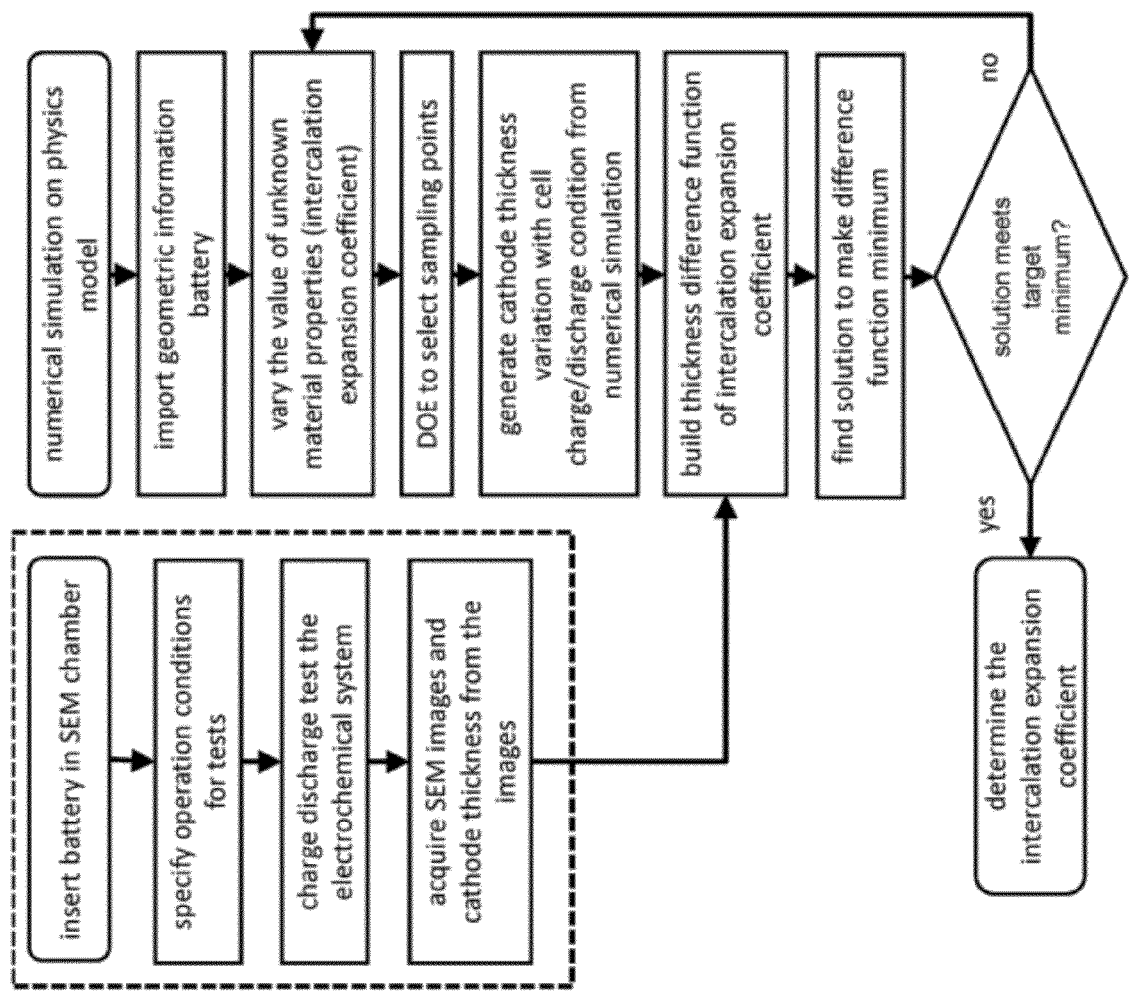
FIG. 10 is a simplified flow diagram of an analysis process using SEM configured with an electrochemical cell according to an embodiment of the present invention.
Figure 11:
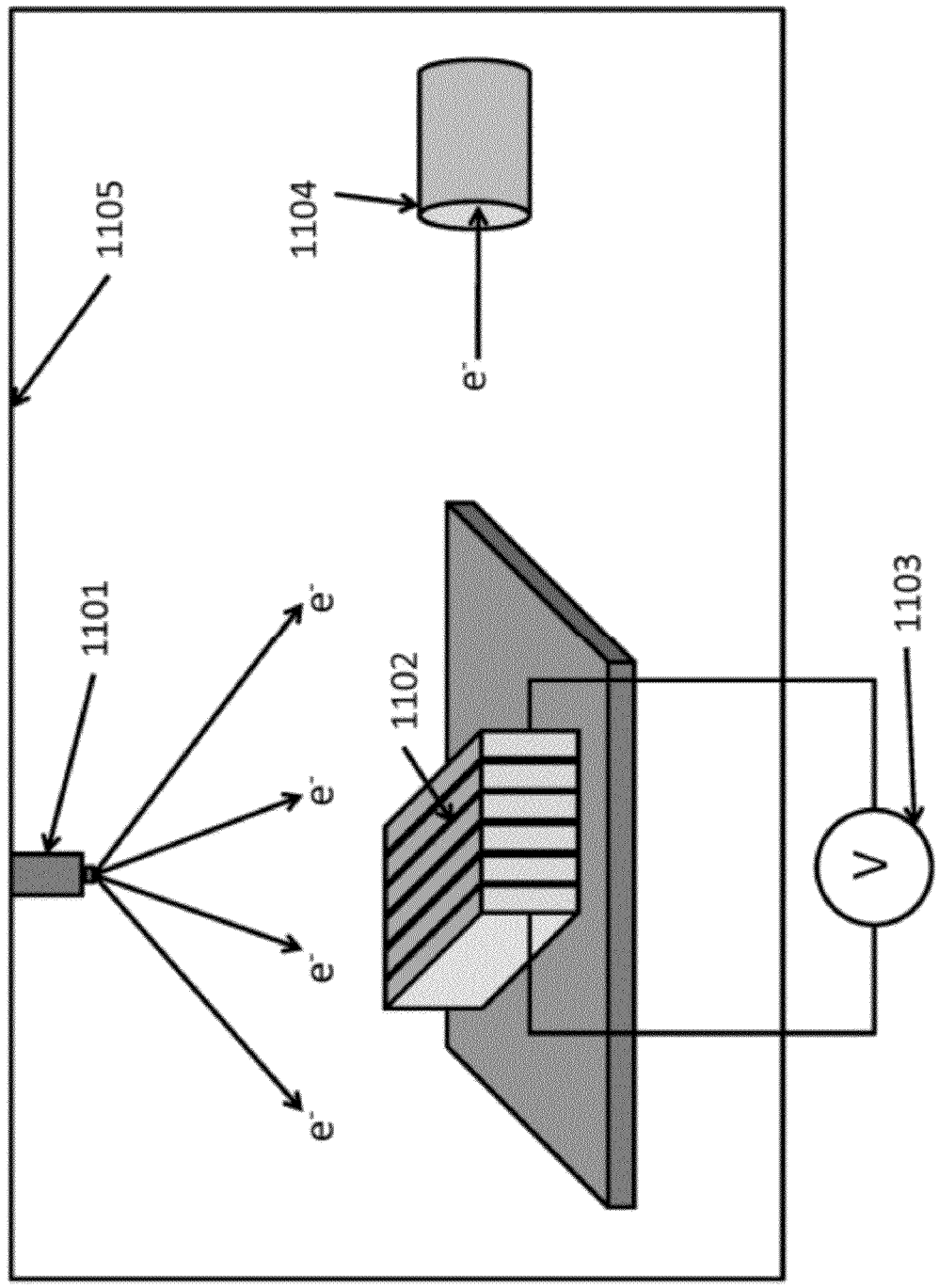
FIG. 11 is a schematic illustration of the SEM of FIG. 9 according to an embodiment of the present invention.

Determination of Intercalation Expansion Coefficient of Cathode Material of an Electrochemical Cell This example demonstrates the process of determination of intercalation expansion coefficient of cathode material of an electrochemical cell. As an example of the problems encountered by a battery designer, the value of intercalation expansion coefficient of cathode material for the present electrochemical cell setup is unknown. The materials for the electrochemical cell include copper as anode current collector, lithium metal as anode, lithium manganese oxide as cathode, polymer with lithium salts as the electrolyte, and aluminum as cathode current collector. A separator is unnecessary because a polymer electrolyte is used. These materials used here are for illustrative purposes, but are not limited by these materials. A flow diagram is shown in FIG. 10. As in this example, the electrochemical cell is tested inside the SEM vacuum chamber as 1105 in FIG. 11. Electron beam as 1102 in FIG. 11 and electron sensor as 1104 in FIG. 11 are used to obtain the image of the cross section surface of the electrochemical cell layer including cathode. Cathode thickness can be measured via SEM images. Battery tester as 1103 is used to charge discharge the electrochemical cell. On the other hand, numerical simulations for the same electrochemical system are conducted with different values of intercalation expansion coefficient resulting various cathode thickness. The difference of experimental and simulation results then can be modeled as a function. By finding the solution to make the difference function minimum, intercalation expansion coefficient of the cathode can be identified.

In a specific embodiment, the computer aided engineering process may employ meshes, or representations of surfaces and volumes, which are generated via a wide range of methodologies. Post-processing of data generated in solution of multi-physics problems is described in general, but can be accomplished as a separate step, using any standard method of mining and presenting data. Of course, there can be other variations, modifications, and alternatives.

Any of the above sequence of steps provides a method according to an embodiment of the present invention. In a specific embodiment, the present invention provides a method and system for designing an electrochemical cell in three dimensions. Other alternatives can also be provided where steps are added, one or more steps are removed, or one or more steps are provided in a different sequence without departing from the scope of the claims herein.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method of designing a thin film battery device and manufacturing the thin film battery device by determining at least one material property of at least one component of an electrochemical system using a process to reduce a difference of a performance characteristic between a numerical simulation result of a physical model and an empirical result, the method comprising:
   providing an electrochemical cell using a thin film process;
   performing a plurality of tests on the electrochemical cell, using a processor, to identify one or more target performance characteristics of the electrochemical cell, the plurality of tests including respective operational modes of the electrochemical cell;
   deriving a plurality of performance characteristics from the plurality of tests to provide a performance database, the performance database comprising the operational modes and the respective performance characteristics;
   performing a surrogate based analysis process;
   determining a plurality of outputs of the surrogate based analysis function; and
   determining a value of the unknown material property.

2. The method of claim 1 wherein the electrochemical cell comprises an anode, cathode, separator, electrolyte, current collectors, substrate, and an overlying barrier material.

3. The method of claim 1 wherein the electrochemical cell is a partially completed electrochemical cell, the partially completed cell comprising at least two layers of any component of anode, cathode, separator, electrolyte, current collectors, substrate, and an overlying barrier material.

4. The method of claim 1 wherein the electrochemical cell is a partially completed electrochemical cell, the partially completed cell comprising at most ten layers of any component of anode, cathode, separator, electrolyte, current collectors, substrate, and an overlying barrier material.

5. The method of claim 1 wherein the unknown material property of the electrochemical cell is at least one of:
   a transport property including at least one of electrical conductivity, ionic conductivity, ionic diffusivity, or thermal conductivity;
   a kinetic property including at least a chemical reaction rate;
   an interfacial property including a contact resistance;
   a mechanical property including at least one of a Young's Modulus, a Poisson's ratio, a bulk modulus, a yield strength, an ultimate stress, a fracture stress, a thermal expansion coefficient, an intercalation expansion coefficient;
   a geometric property including at least one of a porosity, a thickness, a curvature; and
   a spatial variation of a mass density.

6. The method of claim 1 wherein the performance characteristics comprise more than one of a time variation of charge or discharge voltage curve, state of charge (SOC) variation of charge or discharge voltage curve, concentration profile, concentration gradient profile, temperature variation, temperature gradient profile, stress-strain variation, film curvature variation, and stress-strain gradient profile.

7. The method according to claim 1 wherein the operational mode of an electrochemical system comprises at least one of a profiles of constant current charge or discharge, variant current charge or discharge, constant power charge or discharge, variant constant power charge or discharge, constant voltage charge or discharge, variant voltage charge or discharge, and combinations of any of them in a constant temperature or any given temperature profile.

8. The method of claim 1 wherein the determining of the output uses at least one or more of a linear equation algorithm, Levenberg-Marquardt Algorithm, Gauss-Newton Algorithm, Trust-Region Dogleg Method, Trust-Region-Reflective Methods, medium-scale algorithms, or large-scale algorithms.

9. The method of claim 1, wherein the surrogate based analysis process comprises a computer aided engineering process, the computer aided engineering process is selected from at least one of a finite element method (FEM), a finite difference method (FDM), a boundary element analysis, element-free Galerkin (EFG) or Smoothed Particle Hydrodynamics (SPH) method.

10. The method of claim 1 wherein the surrogate based analysis process comprises:
   providing an upper bound and a lower bound for an unknown material property of a material of a component of the electrochemical cell;
   determining a plurality of sampling points between the upper bound and the lower bound of the unknown material property using a design of experiment (DOE) process;
   determining a plurality of performance characteristics for the respective sampling points using a computer aided engineering process and a plurality of fixed parameters, the fixed parameters include at least one of intrinsic material properties, interface conditions, or operational conditions;
   generating a surrogate based analysis function for a difference between the numerical simulation result and the empirical result for the electrochemical cell.

11. The method of claim 10 wherein the surrogate based analysis functions of target performance characteristics against sampling points include exponential, Fourier, Gaussian, interpolant, Kriging, polynomial, power, sinusoidal, Weibull, weight averaged, or any combination of these.

12. The method of claim 10 wherein the computer aided engineering process is for analysis of the electrochemical system and is a multi-physics model, the multi-physics model includes one or more functions to simulate one or more relationships, the relationships include mechanical properties and responses obtained via equilibrium or dynamic load considerations, thermal properties and temperature distributions obtained via heat transfer methods, or cell transport properties potential and concentrations distribution of species obtained via kinetic relations and/or fluid flow modeling.

13. The method of claim 1 wherein the plurality of tests are selected from at least one or more of a cell charge discharge test process, a temperature measurement process, a electrochemical impedance spectroscopy (EIS) test process, a strain gauge test process, a wafer bender test process, or an in-situ SEM cell charge discharge test process.

14. The method of claim 13 wherein the strain gauge test process measures a strain characteristic.

15. The method of claim 13 wherein the wafer bender test process measure a top surface deflection and curvature of the electrochemical system.

16. The method of claim 13 wherein the in-situ SEM cell charge discharge test process images a cross-session the electrochemical system and identifies a thickness and a volume variation during a charge discharge test process.

17. A method of designing a thin film battery device and manufacturing the thin film battery device by determining at least one material property of at least one component of an electrochemical system using a process to reduce a difference of a performance characteristic between a numerical simulation result of a physical model and an empirical result, the method comprising:
   providing an electrochemical cell using a thin film process, wherein the electrochemical cell comprises an anode, cathode, separator, electrolyte, current collectors, substrate, and an overlying barrier material;
   performing a plurality of tests on the electrochemical cell, using a processor, to identify one or more target performance characteristics of the electrochemical cell, the plurality of tests including respective operational modes of the electrochemical cell, wherein the plurality of tests are selected from at least one or more of a cell charge discharge test process, a temperature measurement process, a electrochemical impedance spectroscopy (EIS) test process, a strain gauge test process, a wafer bender test process, or an in-situ SEM cell charge discharge test process;
   deriving a plurality of performance characteristics from the plurality of tests to provide a performance database, the performance database comprising the operational modes and the respective performance characteristics;
   performing a surrogate based analysis process;
   determining a plurality of outputs of the surrogate based analysis function, wherein the determining of the output uses at least one or more of a linear equation algorithm, Levenberg-Marquardt Algorithm, Gauss-Newton Algorithm, Trust-Region Dogleg Method, Trust-Region-Reflective Methods, medium-scale algorithms, or large-scale algorithms; and determining a value of the unknown material property.

18. The method of claim 17 wherein the unknown material property of the electrochemical cell is at least one of:

a transport property including at least one of electrical conductivity, ionic conductivity, ionic diffusivity, or thermal conductivity;

a kinetic property including at least a chemical reaction rate;

an interfacial property including a contact resistance;

a mechanical property including at least one of a Young's Modulus, a Poisson's ratio, a bulk modulus, a yield strength, an ultimate stress, a fracture stress, a thermal expansion coefficient, an intercalation expansion coefficient;

a geometric property including at least one of a porosity, a thickness, a curvature; and a spatial variation of a mass density.

19. The method of claim 17 wherein the surrogate based analysis process comprises:

providing an upper bound and a lower bound for an unknown material property of a material of a component of the electrochemical cell;

determining a plurality of sampling points between the upper bound and the lower bound of the unknown material property using a design of experiment (DOE) process;

determining a plurality of performance characteristics for the respective sampling points using a computer aided engineering process and a plurality of fixed parameters, the fixed parameters include at least one of intrinsic material properties, interface conditions, or operational conditions;

generating a surrogate based analysis function for a difference between the numerical simulation result and the empirical result for the electrochemical cell.

20. The electrode of claim 19 wherein the surrogate based analysis functions of target performance characteristics against sampling points include exponential, Fourier, Gaussian, interpolant, Kriging, polynomial, power, sinusoidal, Weibull, weight averaged, or any combination of these.

* * * * *